(12) United States Patent
Spong et al.

(10) Patent No.: US 7,245,102 B1
(45) Date of Patent: Jul. 17, 2007

(54) METHOD AND SYSTEM OF COMPENSATING WAVE REFLECTIONS IN TRANSMISSION LINES

(75) Inventors: Mark Spong, Champaign, IL (US); Romeo Ortega, Orsay (FR)

(73) Assignee: University of Illinois at Urbana-Champaign, Urbana, IL (US)

( * ) Notice: Subject to any disclaimer, the term of this patent is extended or adjusted under 35 U.S.C. 154(b) by 451 days.

(21) Appl. No.: 10/692,712

(22) Filed: Oct. 24, 2003

(51) Int. Cl.
*G05D 23/275* (2006.01)

(52) U.S. Cl. ...................................... 318/632

(58) Field of Classification Search .................. None
See application file for complete search history.

(56) References Cited

U.S. PATENT DOCUMENTS

| | | | | |
|---|---|---|---|---|
| 4,162,536 A | * | 7/1979 | Morley | 714/18 |
| 5,185,736 A | * | 2/1993 | Tyrrell et al. | 370/358 |
| 5,526,252 A | * | 6/1996 | Erdman | 363/41 |
| 5,990,654 A | * | 11/1999 | Skibinski et al. | 318/800 |
| 6,496,037 B1 | * | 12/2002 | Bertin et al. | 326/82 |
| 6,529,229 B2 | * | 3/2003 | Nagumo | 347/237 |
| 6,594,416 B1 | * | 7/2003 | Sargent et al. | 385/24 |
| 6,636,107 B2 | * | 10/2003 | Pelly | 327/552 |
| 6,801,068 B2 | * | 10/2004 | Yin | 327/172 |
| 2001/0009435 A1 | * | 7/2001 | Nagumo | 347/237 |
| 2003/0151453 A1 | * | 8/2003 | Laletin | 327/551 |

* cited by examiner

*Primary Examiner*—Lincoln Donovan
*Assistant Examiner*—Renata McCloud
(74) *Attorney, Agent, or Firm*—McDonnell Boehnen Hulbert & Berghoff LLP

(57) ABSTRACT

A method and system of compensating wave reflections in transmission lines is provided. The system includes a compensator that transforms a transmission line (which connects an actuator and a motor) into a delay transfer to remove wave reflections, by exploiting a scattering variables representation of the transmission line. The compensator can be a filter with delays that transforms the transmission line into a delay transfer through appropriate linear combinations of delayed or un-delayed voltages and currents. The filter may admit a discrete-time finite-dimensional realization that preserves the wave reflection removal properties for signals. A back-to-back rectifier-inverter or hybrid filter implementation may realize the filter.

25 Claims, 11 Drawing Sheets

METHOD AND SYSTEM OF COMPENSATING WAVE REFLECTIONS IN TRANSMISSION LINES

STATEMENT REGARDING FEDERALLY SPONSORED RESEARCH

This invention was made with partial support from United States government awarded by the National Science Foundation; grant number INT-0128656. The United States government may have certain rights in this invention.

FIELD OF INVENTION

The present invention relates to wave reflections in transmission lines and, more particularly, to a method and system of compensating for wave reflections in transmission lines.

BACKGROUND

In several applications, high-speed switching drive mechanisms are connected to motors through long cables. For example, high power transistors have been used in variable speed drives to achieve high switching speeds and high frequency excitation of wiring connecting to motors. Because the cables have a defined physical length, electrical signals require a finite time to traverse the cables. If this time becomes appreciable relative to the time of one cycle of the exciting voltage, transmission line effects begin to appear on the cables. Even a small length of motor wiring in conduit can exhibit transient overvoltages at the motor due to wave reflections when it is driven by a PWM inverter, for example. The same kind of problems can arise in offshore pump motors supplied through several kilometers of undersea cable, even though the switching speeds may not be especially high.

As a more specific example, actuators may be interconnected to a control plant through long cables (e.g., transmission lines). If the actuator operates at a fast sampling rate (with respect to a propagation delay of the cable) and the actuator's impedance cannot be neglected, electromagnetic wave reflections will occur and transmitted pulses from the actuators will be deformed, degrading control quality. To overcome this problem, two techniques are often used. First, passive linear filters are often introduced to slow a rise time of the transmitted pulse. Unfortunately, this technique generally reduces the achievable bandwidth resulting in a below par performance.

A second solution is to match a load impedance of the control plant to an impedance of the long cables. Traveling waves can reflect back and forth along the line until they are ultimately damped out by transmission line losses. Using this solution, when the line is terminated in its characteristic impedance, there is no reflected wave and voltages and currents are generally uniform along the length of the line. Unfortunately, this approach can be difficult to realize since the choice of the filter parameters to match impedances is not obvious if the plant has nonlinear or uncertain characteristics.

The wave reflection phenomenon is well documented in power distribution and digital communications and is now coming to the forefront in several control applications. Notably, in high-performance drives it is known as a voltage overshoot problem, where the occurrence of high voltage spikes at motor terminals can produce potentially destructive stress on motor insulation, constituting a serious practical problem still asking for a satisfactory solution. (See, e.g., S. C. Lee and K. H. Nam, "An Overvoltage Suppression Scheme for AC Motor Drives Using a Half DC-Link Voltage Level at each PWM Transition", *IEEE Trans. Ind. Elec., Vol. 49, No. 3*, pp. 549–557, June, 2002; and E. Persson, "Transient Effects in Application of PWM Inverters to Induction Motors", *IEEE Trans. Ind. Applicant., Vol. 28, No. 5*, pp. 1095–1101, September/October, 1992).

Voltage overshoot occurs at the motor terminal if the motor is fed by a drive signal through a long feeding cable due to the transmission line behavior on the motor feeding cable. The driver is regarded as a short circuit because its impedance is low compared with the transmission line characteristic impedance. However, the motor impedance presents an effective open circuit. These impedance mismatches cause a voltage reflection that results in a voltage spike at the motor, and thereby constitutes a factor in the voltage overshoot phenomenon. Further, a signal propagation delay occurs in feeding cable transmission lines. If a signal rise time is short compared to the propagation delay, voltage overshoot takes place at the motor terminal, since reflection coefficients at both ends of the cable are normally high.

SUMMARY

In an exemplary embodiment, a method for generating a motor drive signal is provided. The method may be performed by a compensator to lessen wave reflection effects in a transmission line, for example. The method may include obtaining compensator current and compensator voltage measurements, and receiving a motor drive signal. The method also includes generating compensator reference values possibly in part by using a characteristic line impedance and a propagation delay parameter of the transmission line, for example. The method further includes controllably adjusting a compensator current source and a compensator voltage source in response to the compensator current and compensator voltage measurements and the compensator reference values in order to generate a compensator motor drive signal. The sources can be adjusted in response to waveform error signals computed from the compensator current and compensator voltage measurements and the compensator reference values, for example. The sources may be controllably adjusted by a microcontroller, or analog controllers such as a proportional-integral-derivative (PID) controller (or a PI controller).

These as well as other features and advantages will become apparent to those of ordinary skill in the art by reading the following detailed description, with appropriate reference to the accompanying drawings.

BRIEF DESCRIPTION OF FIGURES

Exemplary embodiments of the present invention are described with reference to the drawings, in which.

DETAILED DESCRIPTION OF EXEMPLARY EMBODIMENTS

In an exemplary embodiment, a method and system of compensating wave reflections in transmission lines is presented. The system may include a compensator that transforms a transmission line (which connects an actuator and a motor) into a delay transfer to remove wave reflections, by exploiting a scattering variables representation of the transmission line. The compensator can be a filter providing appropriate linear combinations of delayed and/or un-delayed voltages and currents. The filter may use analog components or may be implemented in a discrete-time finite-dimensional realization that preserves the wave reflection removal properties for signals.

The compensator may include a controlled voltage and a controlled current source. An input compensator voltage and an output compensator current may be measured to calculate an input compensator current and an output compensator voltage value. The calculated values can then be compared to desired values to generate error signals that may be used to controllably adjust the compensator voltage and current sources in order to achieve the desired values. The desired values may be those such that when applied to a transmission line, a delayed version of the desired values is received at the end of the transmission line, to lessen or eliminate wave reflections on the transmission line.

Figure 1A:
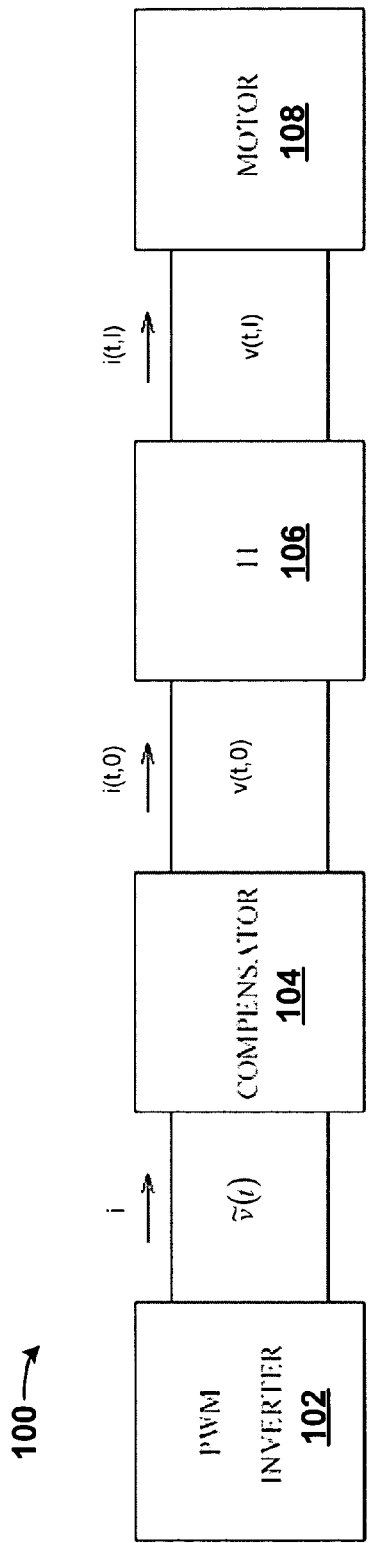
FIGS. 1A and 1B are block diagrams illustrating embodiments of models of a transmission system according to the present invention.

Referring now to the figures, FIG. 1A is a block diagram illustrating a model of a system 100. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location. Still further, any of these or other entities that are described herein as carrying out a particular function could include a processor and data storage holding an appropriate set of program instructions (e.g., machine language instructions) executable by the processor to carry out that function.

The system 100 includes a pulse width modulated (PWM) inverter 102 coupled to a compensator 104, which couples through a transmission line (TL) 106 to a motor 108. The PWM inverter 102 is only one example of a pulse generator that may be used. The compensator 104 receives a pulse generated by the PWM inverter 102, applies an appropriate linear combination of delayed and/or un-delayed voltages and currents, and passes the modified pulse through the TL 106 to the motor 108. The TL 106 is a model of cabling that connects the compensator 104 to the motor 108.

Figure 1B:
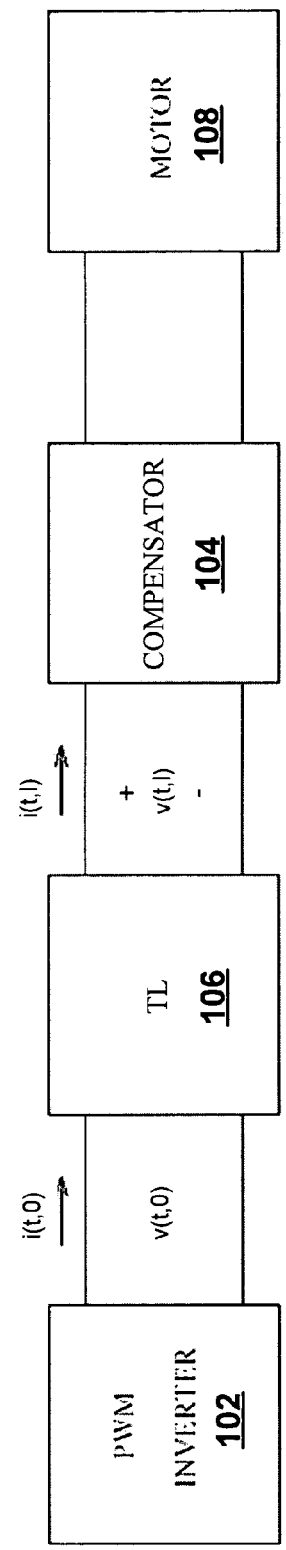

Although the compensator 104 is illustrated positioned between the PWM inverter 102 and the TL 106, the compensator 104 may be positioned elsewhere in the system, so long as the compensator 104 receives the pulse generated by the PWM inverter 102 in order to modify the pulse delivered to the motor 108. For instance, the compensator can be implemented either on the PWM inverter 102 (e.g., actuator) or the motor 108 side of the system 100. FIG. 1B illustrates the second of these configurations. For instance, FIG. 1B illustrates a system 110 including the compensator 104 positioned between the TL 106 and the motor 108.

In AC drive applications, the use of fast switching actuators (such as the PWM inverter 102, which may be based on Insulated Gate Bipolar Transistor (IGBT) technology) induces high voltage spikes at the motor 108 terminals which can produce potentially destructive stress on the motor 108 insulation. The velocity of a reflected wave plus a rise time of the actuator determines a distance at which a reflected wave will reach its maximum amplitude. From experimental evidence (See, e.g., R. J. Kerkman, "Twenty Years of PWM AC Drives: When Secondary Issues Become Primary Concerns", in *IEEE-IECON Conf. Proc.*, Taipei, Taiwan, 1996, pp. 57–63) it is known that this amplitude can be two to four or more times the actuator drive DC bus voltage (for instance, as large as 2400 Volts for a 575 Volt system). The peak value and rise time of the reflected voltage waveform can have a significant impact on the insulation inside the motor 108, which may exhibit mechanical stress cracks in enamel wire insulation and microscopic voids in insulation coating. These holes and cracks can become insulation failure points when voltage peaks are impressed on the motor 108 by the reflected wave phenomenon.

The compensator 104 functions to remove wave effects that appear when a fast sampling actuator, such as the PWM inverter 102 with non-negligible impedance, is coupled to the motor (e.g., control plant) through long feeding cables, such as the TL 106. In this case, the connecting cables can behave as a transmission line inducing a wave reflection that deforms the transmitted pulse from the PWM inverter 102 and degrades the quality of the control.

The TL 106 can be modeled according to Equation 1 below.

$$C\frac{\partial v(t,z)}{\partial t} = -\frac{\partial i(t,z)}{\partial z}, L\frac{\partial i(t,z)}{\partial t} = -\frac{\partial v(t,z)}{\partial z} \qquad \text{Equation 1}$$

where v(t,z) and i(t,z) represent the TL 106 voltage and current, respectively, $z \in [0,l]$ is the spatial coordinate, with l>0 the cable length and C, L>0, which are assumed constant, are the capacitance and inductance of the TL 106, respectively.

The motor cables (e.g., TL 106) represent an impedance to the PWM voltage pulses. The TL 106 contains values of inductance and capacitance that are directly proportional to their length. If the motor 108 is modeled as a resistive impedance, wave reflection of the PWM voltage pulses can be removed by matching the TL 106 impedance to the impedance of the motor 108. This is known as impedance matching and is well documented in the transmission lines literature. But, if the motor 108 (or the actuator) dynamics are uncertain or nonlinear, the effect of these filters on the pulse propagation is difficult to predict, and the distortion might even be amplified.

The compensator system 104 can be modeled as a linear (infinite dimensional) two-port filter with port variables related according to:

$$\begin{bmatrix} \tilde{\imath}(t) \\ \tilde{v}(t,0) \end{bmatrix} = \frac{-1}{1+e^{-2ds}} \begin{bmatrix} \frac{1}{Z_0}(1-e^{-2ds}) & -2 \\ -2e^{-2ds} & -Z_0(1-e^{-2ds}) \end{bmatrix} \begin{bmatrix} \tilde{v}(t) \\ i(t,0) \end{bmatrix} \quad \text{Equation 2}$$

where $$Z_0 = \sqrt{\frac{L}{C}}$$

it the line characteristic impedance, $d=l\sqrt{LC}$ is the propagation delay, $\tilde{v}(t)$ is the line voltage at the PWM inverter 102, $\tilde{\imath}(t)$ is the line current at the inverter 102, and $v(t,0)$ and $i(t,0)$ are the line voltage and line current at the beginning of the TL 106. As proved in R. Ortega, M. W. Spong, S. Lee, and K. Nam, "On Compensation of Wave Reflections in Transmission Lines and Applications to the Overvoltage Problem in AC Motor Drives," *IEEE Transactions on Automatic Control*, submitted for publication November, 2002, the compensator 104 in cascade with the TL 106 (e.g. FIG. 1A) yields $v(t,l)=\tilde{v}(t-d), i(t,l)=\tilde{\imath}(t-d)$, where $v(t,l)$ is the line voltage at the motor 108, and $i(t,l)$ is the line current at the motor 108. Thus the line voltage, $\tilde{v}(t)$, at the inverter 102, and the line current, $\tilde{\imath}(t)$, at the inverter 102 are reproduced at the motor 108 after the characteristic delay time $d=l\sqrt{LC}$.

Figure 2:
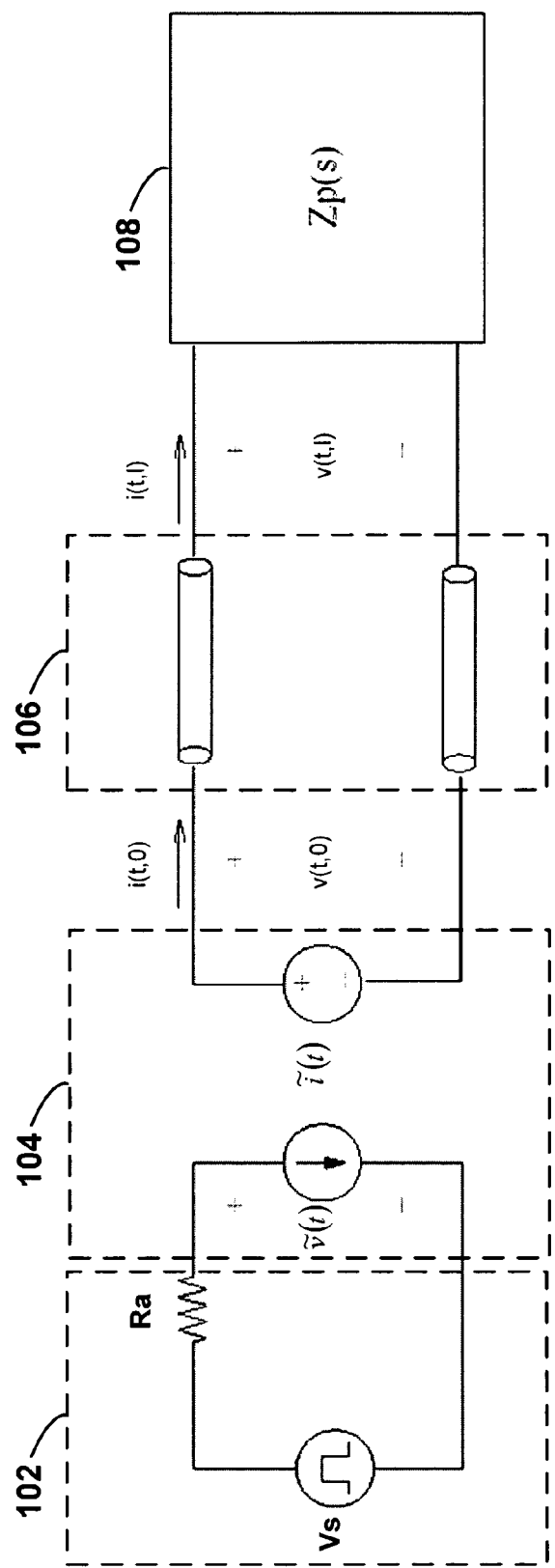
FIG. 2 illustrates one embodiment of a compensator within the transmission system of FIGS. 1A and 1B.

The compensator 104 may be realized as shown in FIG. 2. For example, the compensator 104 may include a regulated current source ($\tilde{\imath}(t)$) terminating the end port of the PWM inverter 102 (which has drive voltage $v_s(t)$) and a regulated voltage source ($\tilde{v}(t)$) terminating the front port of the TL 106. The PWM inverter 102 provides a desired motor drive voltage signal. The PWM inverter 102 is modeled as an ideal PWM voltage source plus a series resistor (e.g., $R_A=7\Omega$ which is a big value for DC or the fundamental frequency component and represents the high frequency terms in the rising and falling edges of the PWM pulses). For such high frequency components, the inverter contains large stray inductance, skin effects, and RF emission losses. If such losses are included in $R_A$, it goes up to $7\Omega$ and we call it surge impedance.

Reference values for the current and voltage sources of the compensator 104 are a linear combination of actual and delayed values of the currents and voltages extracted from the PWM inverter 102, which are transmitted to the TL 106 according to the formula in Equation 2 above (explained more fully below).

The compensator 104 functions as a filter to modify signals generated by the PWM inverter 102. Alternatively, the end port of the PWM inverter 102 could be terminated with a regulated voltage source $\tilde{v}(t)$, and the front port of the TL 106 could be terminated with a regulated current source $i(t,0)$, in order to form a compensator function for the motor 108. Other options are possible as well. For example, either of the alternative embodiments described above may be implemented as shown in FIG. 1B by placing a compensator in cascade between the TL 106 and motor 108. In these cases the end port of the compensator 104 could be terminated with a regulated voltage source, and the front port of the motor 108 could be terminated with a regulated current source (and conversely, the end port of the compensator 104 could be terminated with a regulated current source and the front port of the motor 108 could be terminated with a regulated voltage source).

Generating and/or Compensating a Motor Drive Signal

Figure 3:
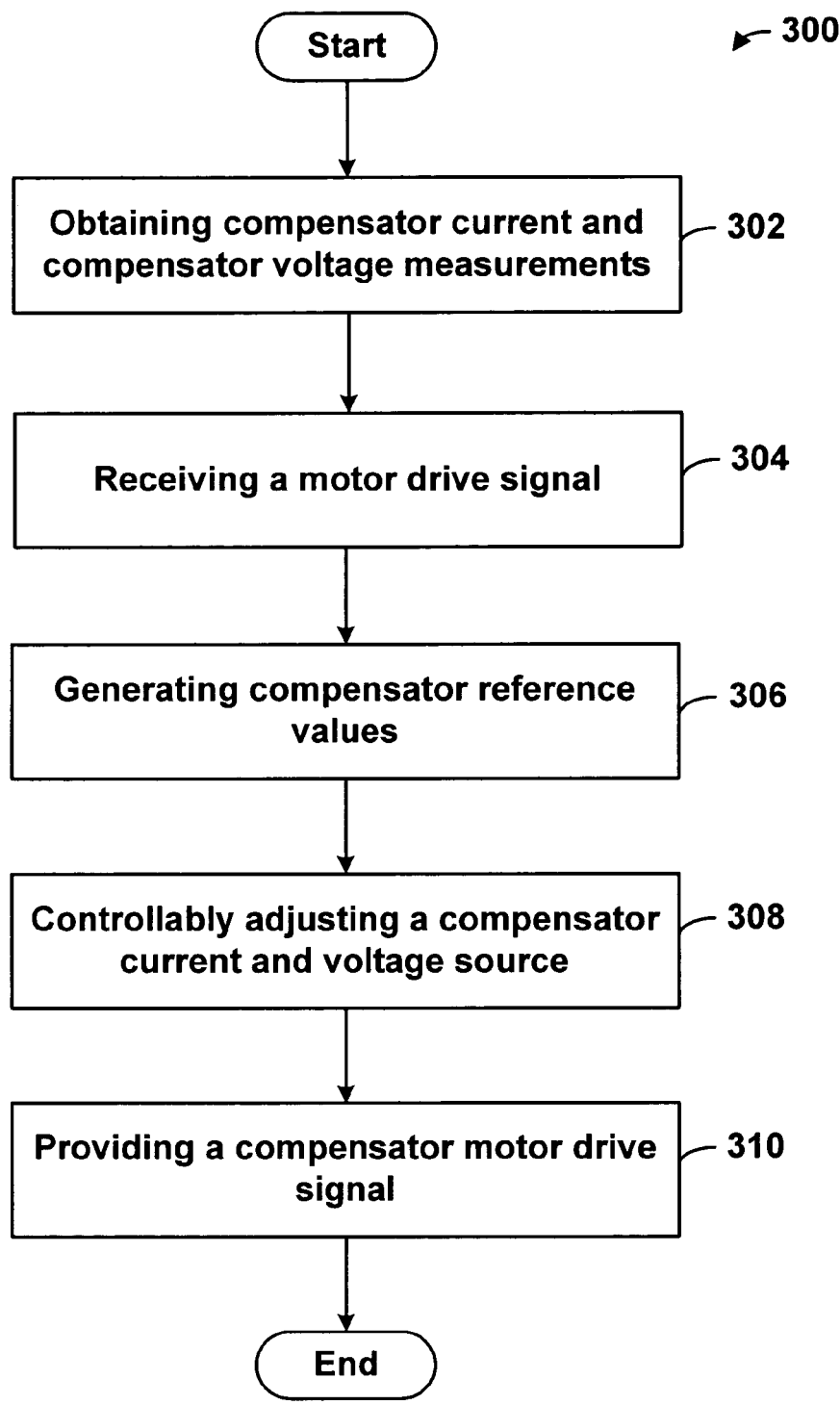
FIG. 3 is a flowchart depicting one embodiment of a method of compensating wave reflections in transmission lines.

FIG. 3 is a flowchart depicting one embodiment of a method 300 of compensating wave reflections in transmission lines. The method 300 may be performed by the compensator 104 to lessen wave reflection effects in a transmission line. As shown at block 302, initially a compensator current and compensator voltage measurement can be obtained. For example, the signals $\tilde{v}$ and $i(t,0)$ (e.g., a compensator input voltage and compensator output current) can be measured. The signals $\tilde{v}$ and $i(t,0)$ can be analog signals or discrete time signals. As shown at block 304, a motor drive signal is then received. For example, the compensator 104 is driven with the signal $v_s(t)$, which is received from the PWM inverter 102.

The method then includes generating compensator reference values, as shown at block 306. For example, signals $\tilde{\imath}$ and $\tilde{v}(t,0)$ in FIG. 2 are generated based on estimated values of desired signals where the desired signals are time delayed versions of the PWM inverter's voltage and current. The signals $\tilde{\imath}$ and $\tilde{v}(t,0)$ may be reference current and reference voltage waveforms that are continuous-time signals or discrete-time signals that may be stored in a memory device coupled to or included in the compensator. The signals $\tilde{\imath}$ and $\tilde{v}(t,0)$ may be determined in part by a characteristic line impedance and a propagation delay parameter of the TL 106. For example, using the measured signals $\tilde{v}$ and $i(t,0)$, theoretical values for signals $\tilde{\imath}$ and $\tilde{v}(t,0)$ may be calculated using Equation 2 with the knowledge of the characteristic impedance $Z_0$ of the line. The characteristic line impedance may be estimated based on material properties of the TL 106, such as by using a line impedance look-up table. The propagation delay parameter may also be estimated based on material properties of the TL 106, such as based on the characteristic line impedance and the length of the TL 106. Alternatively, the propagation delay parameter can be estimated based on propagation delay measurements.

Next, a compensator current source and a compensator voltage source (as shown in the compensator 104 in FIG. 2) can be controllably adjusted in response to the compensator current and compensator voltage measurements and the compensator reference values, as shown at block 308. The sources can be adjusted in response to waveform error signals computed from the compensator current and compensator voltage measurements (e.g., the signals $\tilde{v}$ and $i(t,0)$) and the compensator reference waveforms (e.g., the signals $\tilde{\imath}$ and $\tilde{v}(t,0)$). The waveform error signals may be generated based on a comparison of values of the signals $\tilde{\imath}$ and $\tilde{v}(t,0)$ with desired values of these signals, for example. The sources may then be adjusted to modify the values of the signals $\tilde{v}$ and $i(t,0)$ in order to achieve the desired values. The sources may be controllably adjusted by a microcontroller, or analog controllers such as a proportional integral derivative (PID) controller (or a PI controller).

Last, a compensator motor drive signal can be output, as shown at block 310. For example, the signals $i(t,0)$ and $v(t,0)$ are output such that the signals $i(t,l)$ and $v(t,l)$ are input to the motor.

Using the method 300, the voltage applied to the motor is modified from that output from the PWM inverter 102 so that when this modified voltage is combined with wave reflections, the motor voltage is that as desired. For example, $v(t,0)$ is the modified (e.g., delayed) voltage applied to the motor 108, and it is then reflected, which when combined with the next voltage pulse produces v(t,l) (i.e., the desired motor input voltage).

Back-to-Back Realization of the Compensator

Figure 4A:
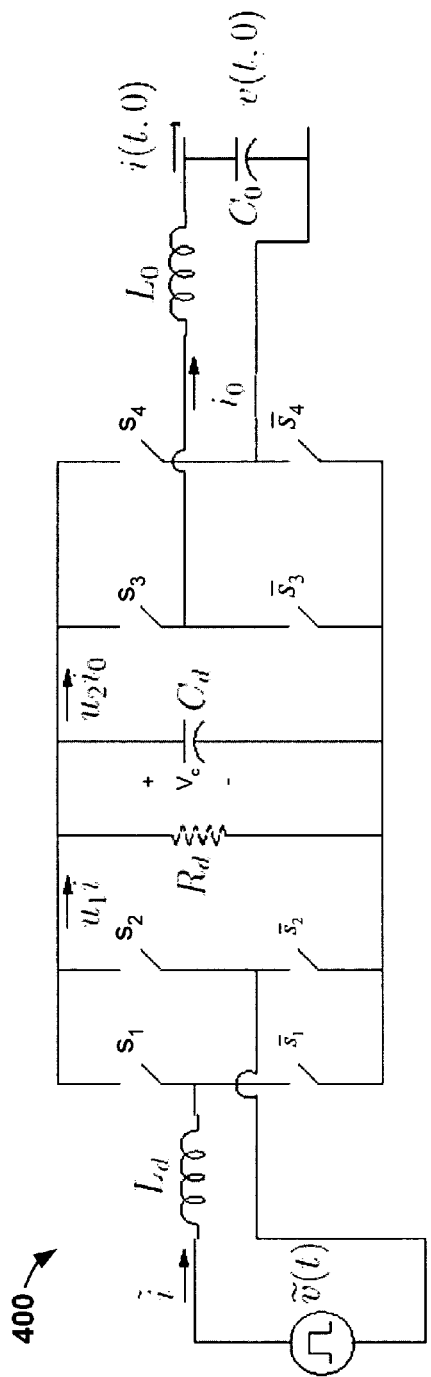
FIGS. 4A and 4B illustrate one embodiment of a schematic diagram of the compensator of FIG. 2.

FIG. 4A illustrates one embodiment of a schematic diagram of the compensator 400. The compensator 400 is illustrated as a back-to-back rectifier-inverter where current extracted from the PWM inverter ($\tilde{\text{i}}$) and voltage supplied to the TL (v(t,0)) are regulated to track reference signals. Reference signals that need to be tracked are typically of very high frequency, which requires fast switching devices.

In particular, the compensator 400 includes a regulated voltage $\tilde{v}(t)$, an inductance $L_d$, a resistance $R_d$, a capacitance $C_d$, switches $s_1, \bar{s}_1, s_2, \bar{s}_2, s_3, \bar{s}_3, s_4, \bar{s}_4$, and output inductance $L_O$ and output capacitance $C_O$. The signals $u_1, u_2$ control the switching of switches and ensure reference tracking with a sufficiently fast convergence rate.

The back-to-back rectifier-inverter is placed between the PWM inverter and the motor where the current extracted from the PWM inverter, which is denoted $i_0$, and the voltage supplied to the TL, which is denoted $v_0$, are regulated, via the action of the switches, to track reference signals $\tilde{i}$ and v(t,0), respectively, which signals are generated via Equation 2.

A control law for the switches of the back-to-back implementation, i.e., the signals $u_1$ and $u_2$ in FIG. 4A, which may ensure reference tracking with a sufficiently fast convergence rate is presented below. Denoting $i_1, i_0, v_0,$ and $v_c$ with the current extracted from the PWM inverter, the current in the inductor $L_O$, the voltage applied to the TL, and the voltage across the capacitor in the DC link, respectively, the inverter equations are written as:

$$L_d \frac{di_1}{dt} = \tilde{v} - u_1 v_c \quad \text{Equation 3-6}$$

$$C_d \frac{dv_c}{dt} = -\frac{1}{R_d} v_c + u_1 i_1 - u_2 i_0$$

$$L_0 \frac{di_0}{dt} = u_2 v_c - v_0$$

$$C_0 \frac{dv_0}{dt} = i_0 - i(t, 0)$$

where $u_i \in \{-1, 0, 1\}$, (i=1, 2). By using switches that commute sufficiently fast, with respect to the bandwidth of the signals, the control signals are continuous signals ranging in (−1, 1).

For correct operation of the compensator, the DC link voltage should be bounded away from zero, that is, $v_c(t) \geq \epsilon > 0$. In terms of new control signals defined as $e_i = u_i v_c$, (i=1, 2), and a new coordinate $$z = \frac{1}{2} v_c^2,$$

the dynamics of the compensator take the following form:

$$L_d \frac{di_1}{dt} = \tilde{v} - e_1 \quad \text{Equation 7-10}$$

$$C_d \frac{dv_c}{dt} = -\frac{2}{R_d} z + e_1 i_1 - e_2 i_0$$

$$L_0 \frac{di_0}{dt} = e_2 - v_0$$

-continued $$C_0 \frac{dv_0}{dt} = i_0 - i(t, 0)$$

The following equations comprise the control laws:

$$e_1 = v + \frac{k_1}{p + k_2}(i_1 - i_1^*) + \frac{k_3 p}{p + k_2} i_1^* \quad \text{Equation 11-12}$$

$$e_2 = v(t, 0) - k_4[i_0 - i(t, 0)] - k_5 v_0 - \sum_{k=1}^{q} \frac{2\gamma_k p^2}{p^2 + k^2 \omega^2} \tilde{v}_0$$

where $$p = \frac{d}{dt}$$

is the usual symbolic operator used to represent differentiation, $i_1^* = \tilde{i} + g\tilde{v}$, $$g = -\frac{k_6}{p + k_2}\left[z - \frac{1}{2}(v_c^*)^2\right] - \frac{k_7}{p}\left[z - \frac{1}{2}(v_c^*)^2\right],$$

$\tilde{v}_0 = v_0 - v(t, 0)$, and $k_i$, (i = 1, ..., 7), $\gamma_i$, (i = 1, ..., q), are positive constants, and q is the number of spectral lines that are desired to be rejected with the resonant filters (typically q=1,2), and $\omega=2\pi f_s$, with $f_s$ the sampling frequency of the device and $v_c^* > 0$ is a constant reference for the DC link voltage. The parameters $k_i$ and $\gamma_i$ can be adjusted according to the state of the art in order to influence various performance measures, such as a rate of convergence of signals to their reference values, time constants and cut-off frequencies of the transfer functions in Equations 11–12.

The rationale of the control law in Equations 11–12 is as follows. First, consider the rectifier part. The signal $i_1^*$ represents a reference for $i_1$ which, in view of the construction of the term $g\tilde{v}$, has the same mean value as $\tilde{i}$ since $g\tilde{v}$ has a mean value of zero. The control $e_1$ cancels $\tilde{v}$ and adds the output of a (filtered) PD that ensures $i_1 \to i_1^*$ with dynamics determined by $k_1$ and $k_3$. The bandwidth of the filters, fixed by $k_2$, is chosen sufficiently large to cut the high-frequency harmonics of the signals.

The signals $\tilde{v}$ and i(t,0) in Equations 11–12 are the compensator current and compensator voltage measurements. The signals $\tilde{i}$ and v(t,0) in Equations 11–12 (e.g., $\tilde{v}_0 = v_0 - v(t,0)$ and $i_1^* = \tilde{i} + g\tilde{v}$) are then generated from Equation 2. The signals $\tilde{v}_0 = v_0 - v(t,0)$ and $(i_1 - i_1)$ in Equations 11–12 are the error signals, which provide a manner to enable convergence of the signals $i_1 \to i_1^* = \tilde{i}$ on average, and $\tilde{v} \to v(t,0)$. The calculated theoretical signals $\tilde{i}$ and v(t,0) are essentially compared to desired values of these signals, such as those simulated in FIG. 5 below, to determine the error signals. Using the error signals, the compensator current source and the compensator voltage source (as shown in the compensator 104 in FIG. 2) can be controllably adjusted to achieve the desired values of the signals. For example, the sources are adjusted such that the signals i(t,l) and v(t,l) are time-delayed versions of the signals i(t,0) and v(t,0).

Figure 4B:
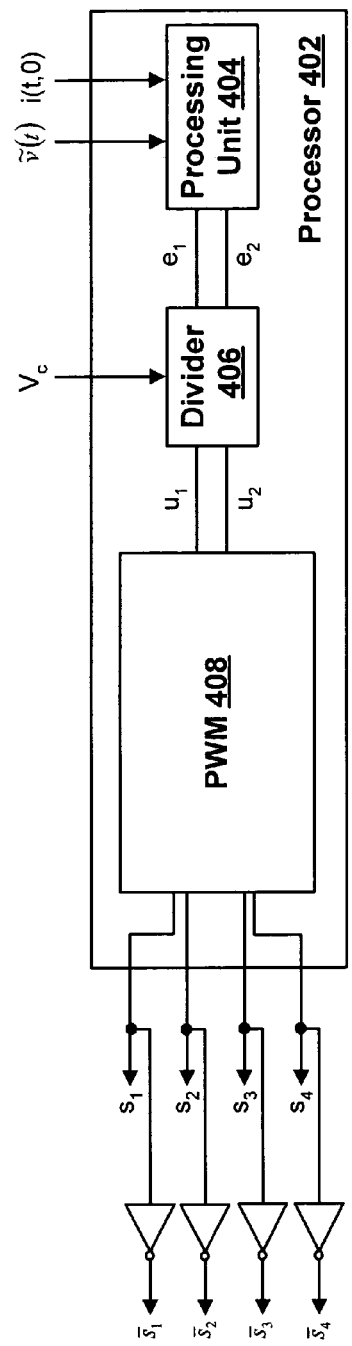

The signals $u_1$ and $u_2$, which are used to controllably adjust switches $s_1-s_4$ to achieve the desired values of i(t,0) and v(t,0), are continuous times signals (assuming a fast sampling rate), and thus are first converted to discrete time in order to control the switching of switches $s_1$–$s_4$. (Signal $u_1$ controls switching of switches $s_1$–$s_2$ and signal $u_2$ controls switching of switches $s_3$–$s_4$). For example, as shown in FIG. 4B, the signals $\tilde{v}$ and $i(t,0)$ are input into a processor 402 that may then calculate signals $\tilde{i}$ and $v(t,0)$ using Equation 2. Values for $e_1$ and $e_2$ can then be calculated from Equations 11–12 within a processing unit 402. The signals $e_1$ and $e_2$ are then passed through a divider 406 to divide them by $v_c$ to obtain values of $u_1$ and $u_2$. In some instances, the signals $e_1$ and $e_2$ can be divided by a reference value $v_c^*$.

The signals $u_1$ and $u_2$ are then sent to a PWM 408 where they are clipped to the range $[-1, 1]$ and compared with a triangular (e.g., saw-tooth) signal, $m(t)$, to generate a positive pulse when $u_1(t)>m(t)$ and a zero otherwise. This resulting binary signal controls the switch $s_1$. For example, when $u_1(t)>m(t)$, $s_1$ is closed, and $\bar{s}_1$ is open. To control switching of $s_2$, the signal $u_1(t)$ is compared with a signal obtained by shifting $m(t)$ by 180 degrees, and when $u_1(t)>$shifted $m(t)$, then $s_2$ is closed, and $\bar{s}_2$ is open. The same policy applies to control signal $u_2$ to control switches $s_3$–$s_4$. Below is a table indicating the correspondence between control signals $u_1$ and $u_2$ and switches $s_1$–$s_4$.

TABLE 1

| |
|---|
| $u_1(t) > m(t)$: $s_1$ is closed, and $\bar{s}_1$ is open |
| $u_1(t) < m(t)$: $s_1$ is open, and $\bar{s}_1$ is closed |
| $u_1(t) >$ shifted $m(t)$: $s_2$ is closed, and $\bar{s}_2$ is open |
| $u_1(t) <$ shifted $m(t)$: $s_2$ is open, and $\bar{s}_2$ is closed |
| $u_2(t) > m(t)$: $s_3$ is closed, and $\bar{s}_3$ is open |
| $u_2(t) < m(t)$: $s_3$ is open, and $\bar{s}_3$ is closed |
| $u_2(t) >$ shifted $m(t)$: $s_4$ is closed, and $\bar{s}_4$ is open |
| $u_2(t) <$ shifted $m(t)$: $s_4$ is open, and $\bar{s}_4$ is closed |

The operation of the PWM 408 is further explained in John G. Kassakian, Martin F. Scholecht, George C. Verghese, Principles of Power Electronics, Series in Electrical Engineering, Addison Wesley, 1991, which is incorporated herein by reference and to which the reader is referred for additional information. The signals $s_1$–$s_4$ are then output from the processor 402 according to Table 1, and signals $\bar{s}_1$–$\bar{s}_4$ are obtained by passing the signals $s_1$–$s_4$ through not-gates.

Now, the current dynamics are typically faster than the voltage dynamics, consequently for a small $T_1$, $i_1(t)=i_1^*(t)$, for all $t \geq T_1$. Under this criteria the voltage dynamics reduce to:

$$C_d \frac{dz}{dt} = -\frac{2}{R_d} z + \tilde{v}^2 g + \xi \qquad \text{Equation 13}$$

where $$\xi = \tilde{v}\tilde{i} - e_2 i_0 + \tilde{i}_1^* \left( \frac{k_3 p}{p + k_2} \tilde{i}_1^* \right).$$

Equation 13 may be viewed as a filter, with transfer function $$\frac{\tilde{v}^2}{C_d p + \frac{2}{R_d}},$$

input g, a positive slowly time varying gain $\tilde{v}^2$ and an additive perturbation $\xi$. The mean steady-state behavior of $\xi$ is a constant plus high-frequency harmonics due to the first two terms plus other (even higher) harmonics stemming from the last term. Finally, the signal g is generated from a (filtered) proportional and integral action around the voltage error. The integral action takes care of the unknown constant term mentioned before, hence neglecting the high-frequency harmonics, $v_c(t) \to v_c^*(t)$, as desired.

The inverter portion is described by a second order linear time invariant system (with state $(i_0, v_0)$) perturbed by a measurable signal $(i(t,0))$. Since the system has relative degree one with respect to both the variable to be controlled $(v_0)$ and the disturbance, the tracking problem reduces to one of reconstructing the derivatives of the reference and the disturbance $$\left( \frac{d}{dt} v(t, 0) \text{ and } \frac{d}{dt} i(t, 0), \text{ respectively} \right).$$

The proposed controller achieves this objective assuming the signals to be reconstructed admit a q-th term Fourier series expansion with unknown coefficients that are estimated with a standard gradient update law. More precisely, replacing the expression of $e_2$ given above on the inverter dynamics, and differentiating the voltage, the following is obtained:

$$L_0 C_0 \left( \frac{d^2}{dt} \tilde{v}_0 \right) + k_4 C_0 \left( \frac{d}{dt} \tilde{v}_0 \right) + (1 + k_5) \tilde{v}_0 = \Phi - \hat{\Phi} \qquad \text{Equation 14}$$

where $$\Phi = -\left[ k_4 C_0 \left( \frac{d}{dt} v(t, 0) \right) + L_0 C_0 \left( \frac{d^2}{dt} v(t, 0) \right) + L_0 \left( \frac{d}{dt} i(t, 0) \right) \right].$$

The solution of Equation 14 thus determines the voltage term $v_0$.

Although the parameter update law may not be able to be implemented in this form, because $$\frac{d}{dt} \tilde{v}_0$$

is not measurable, some simple algebraic manipulations show that their action can be realized with the resonant filters given above.

Figure 5:
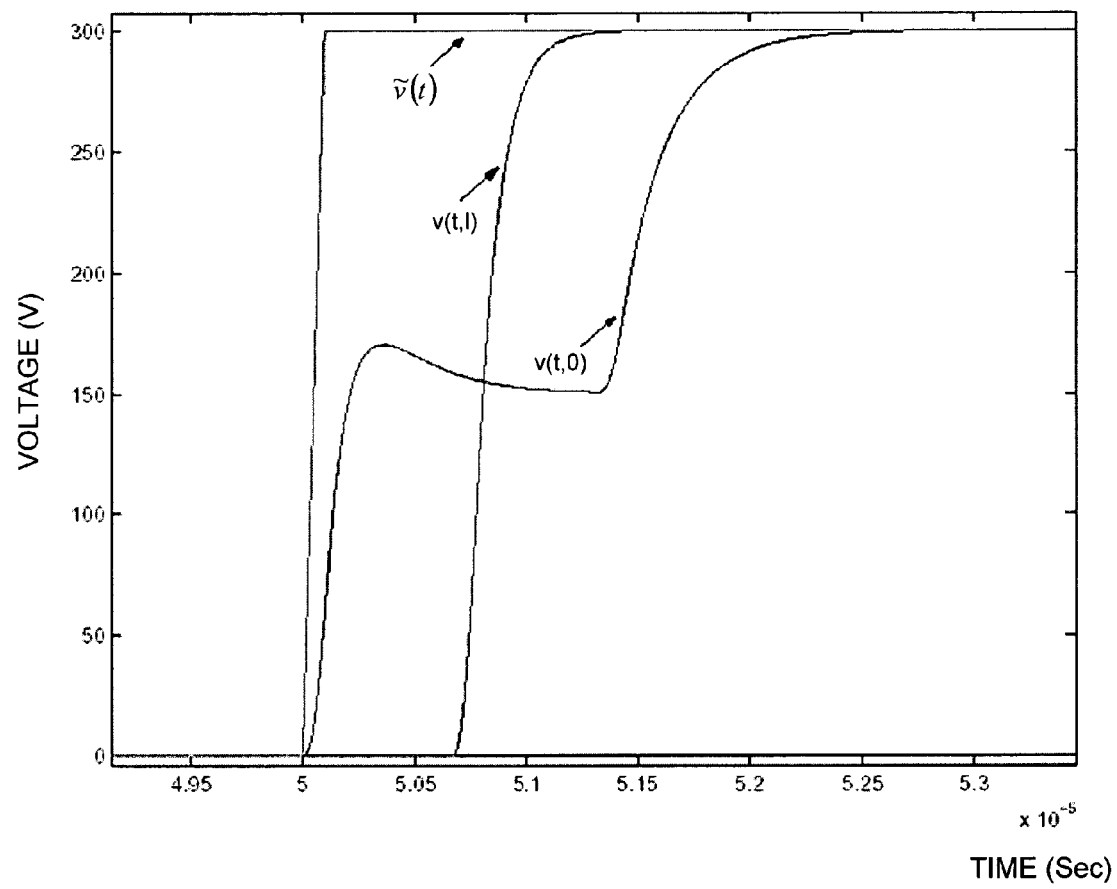
FIG. 5 illustrates example plots of voltage levels within the transmission system of FIG. 1.

Simulations have been made of the inverter part of the controller (that is, $u_2$), using a fast switching rate, and taking the voltage in the capacitor $C_d$ to be constant and the current to be ideally regulated. The system parameters used were L=0.97 µH/m; C=45 pF/m; d=1√LC=6:6 nsec; $Z_0$=146.8Ω; $R_p$=300Ω; $L_d$=3 mH; $C_d$=1000 µH; $R_d$=2KΩ; $L_0$=1 mH; $C_0$=10 µH. FIG. 5 illustrates example plots of $v(t)$, $v(t,0)$ within systems 100 and 110 using the compensator 400. The voltage $v(t)$, is the regulated voltage within the compensator 400 and reaches a peak voltage of 300V in this example. The voltage $v(t,0)$ is the voltage output from the compensator 400 and rises to a voltage of 150V, and after the delay of approximately 0.15 seconds, rises to the peak voltage of 300V. The voltage $v(t,l)$ is the voltage seen at the motor, and is a combination of the voltage applied by the compensator 400 and reflected voltage pulses from the motor. As illustrated in this example, v(t,l) is a delayed version of $\tilde{v}$(t), delayed by about 0.055 seconds. It may be desirable to shape v(t,0) in a time period corresponding to a pulse width of $\tilde{v}$(t), such that a minimum pulse width of $\tilde{v}$(t) is a time necessary for v(t,0) to reach a peak magnitude. As shown, the voltage applied to the motor v(t,l) has a slower rise time than the original pulse $\tilde{v}$(t).

Hybrid Filter Realization of the Compensator

Figure 6A:
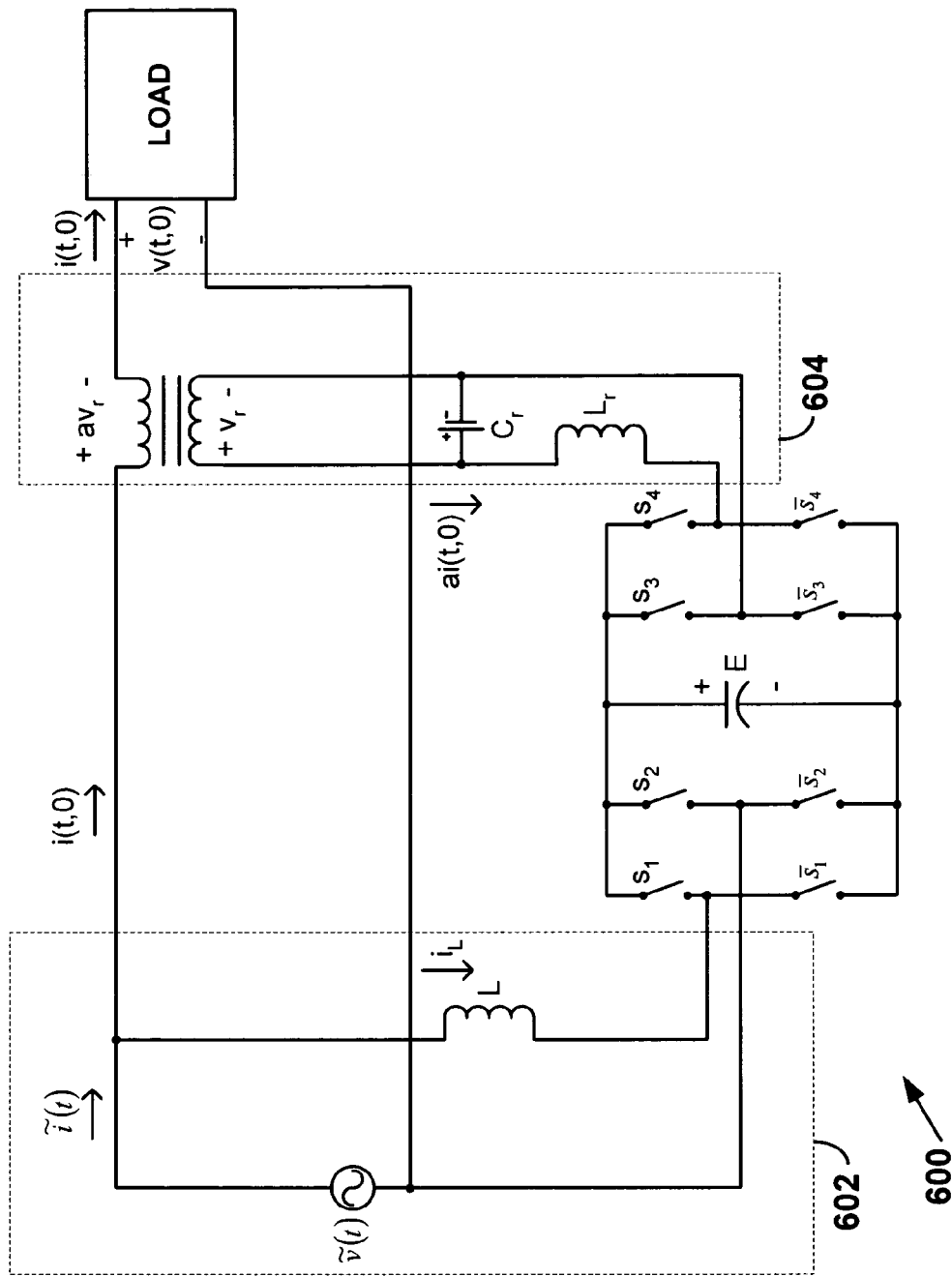
FIGS. 6A and 6B illustrate another embodiment of a compensator within the transmission system of FIGS. 1A and 1B.

FIG. 6A illustrates another embodiment of a schematic diagram of a compensator 600. In this embodiment, the compensator 600 is represented as a hybrid filter where, similarly to the circuit above, the current extracted from the PWM inverter ($\tilde{i}$) and the voltage supplied to the TL (v(t,0)) are regulated to track the reference signals given above, but this is now done indirectly through the extraction of a current ($i_L$) and the injection of a voltage ($av_r$), respectively. For example, given a transmission line characteristic and length of the line, the reference values $\tilde{i}$ and v(t,0), and measured values $\tilde{v}$ and i(t,0), the current $i_L$ can be determined (e.g., $i_L = \tilde{i} + i(t,0)$). Now, the switches can be operated to achieve the computed current $i_L$.

The compensator in FIG. 6A includes a parallel active filter 602 and a series active filer 604 coupled by a series of switches that control operation of the hybrid filter. For more information on active filters, the reader is referred to L. Moran and G. Joos, Principles of Active Power Filters, IEEE—IAS Tutorial Course Notes, October 1998, Saint-Louis, Mo., USA, which is incorporated herein by reference. Some products reviewed in this reference that implement similar control actions of the compensator are: Siemens Power Conditioner (SIPCON); Fuji Electric Shunt Active Power Filter; CEGELEC Shunt Active Power Filter; Meiden Multi-Functional Active Filter; ABB series Filter Dynamic Voltage Regulator (DVR) and shunt Filter Distribution Static Synchronous Compensator (DSTATCOM); and Mitsubishi Electric MELACT-1100 Series of active power filters.

The control law for the switches of the hybrid filter are the signals $u_1$ and $u_2$ in FIG. 6A, which reference tracking with a sufficiently fast convergence rate. The hybrid filter equations are below:

$$L\frac{di_L}{dt} = \tilde{v} - e_1$$

$$L_r\frac{di_0}{dt} = e_2 - v_r$$

$$C_r\frac{dv_r}{dt} = ai_0 - ai(t,0)$$

Equations 15–17 where new control signals are defined as $e_i = u_i E$, (i=1, 2), and the switches commute sufficiently fast, with respect to the bandwidth of the signals, so that the control signals are continuous signals ranging in (−1, 1).

The following equations comprise the control laws:

$$e_1 = \tilde{v} - L\left(\frac{k_1}{p+k_2}\tilde{i}_L\right) + k_3 \tilde{i}_L$$

$$e_2 = v_r^* - k_4[i_0 - i(t,0)] - k_5 \tilde{v}_r - \sum_{k=1}^{q} \frac{2\gamma_k p^2}{p^2 + k^2\omega^2}\tilde{v}_r$$

Equations 18–19 where $\tilde{i}_L = i_L - i_L^*$, $\tilde{v}_r = v_r - v_r^*$, $k_i$, (i=1, ..., 5), $\gamma_i$, (i=1, ..., q), are positive constants, q is the number of spectral lines that are desired to be rejected with the resonant filters (typically q=1, 2), $\omega = 2\pi f_s$, with $f_s$ the sampling frequency of the device. The voltage controller establishes $e_2$ identical to the one explained above since the dynamical systems are the same. The current controller, $e_1$ cancels $\tilde{v}$ and adds, with the term in parenthesis, a dirty derivative approximation of $$\frac{d}{dt}i_L^*$$

plus a term proportional on the current error to obtain the approximate behavior:

$$L\left(\frac{d}{dt}\tilde{i}_L\right) = -k_3 \tilde{i}_L$$

Equation 20

The signals $\tilde{v}$ and i(t,0) in Equations 18–19 are the compensator current and compensator voltage measurements. The signals $\tilde{i}$ (in $i_L = \tilde{i} + i(t,0)$) and v(t,0) (in $\tilde{v} = v_r + v(t,0)$) in Equations 18–19 are then generated from Equation 2. The signals $\tilde{i} = i_L - i_L^*$ and $\tilde{v}_r = \tilde{v} - v_r^*$, in Equations 18–19 are the error signals, which provide a manner to enable convergence of the signal $i_L \to i_L^*$ on average, and $\tilde{v}_r \to v(t,0)$. The calculated theoretical signals $\tilde{i}$ and v(t,0) are essentially compared to desired values of these signals, such as those simulated in FIG. 5 or others that may be stored within the compensator 600, to determine the error signals. Using the error signals, the compensator current source and the compensator voltage source (as shown in the compensator 104 in FIG. 2) can be controllably adjusted to achieve the desired values of the signals. For example, the sources are adjusted such that the signals i(t,l) and v(t,l) are time-delayed versions of the signals i(t,0) and v(t,0).

Figure 6B:
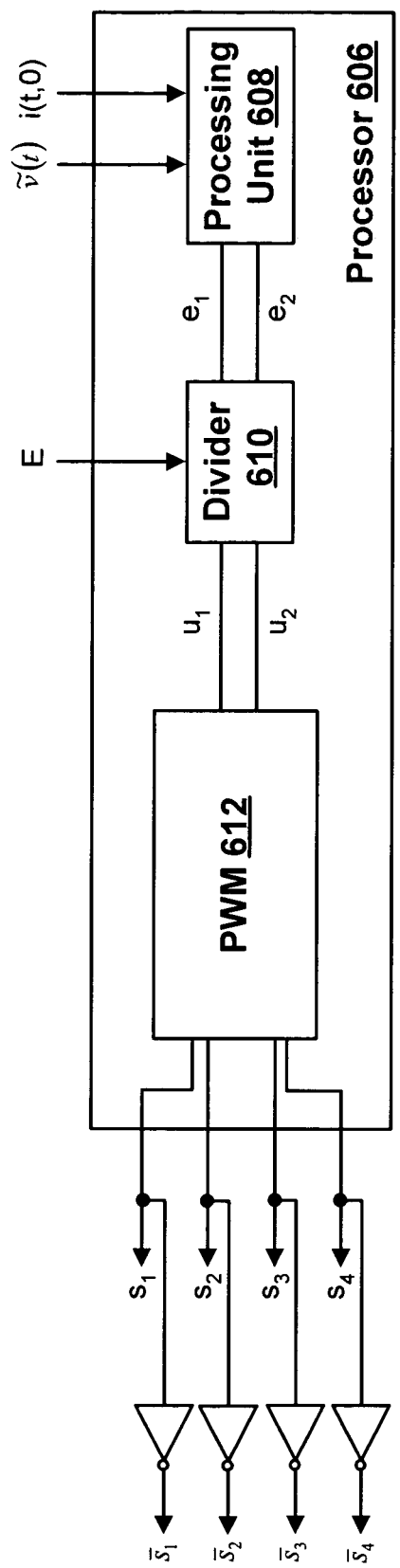

Some additional circuitry that is required to realize the various operations of the compensator 600 include a microcontroller (or a DSP) circuit for signal conditioning and the gating. For example, FIG. 6B illustrates a processor 606 (which may be similar to processor 402) accepting as inputs the signals $\tilde{v}$(t) and i(t,0), in order to compute the control law outputs $s_{1-4}$ according to Equations 18–19. The processor 606 may be a pulse controller, such as a pulse width modulation controller, for example.

As shown in FIG. 6B, the signals $\tilde{v}$ and i(t,0) are input into the processor 606 that may then calculate signals $\tilde{i}$ and v(t,0) using Equation 2. Values for $e_1$ and $e_2$ can then be calculated from Equations 18–19 within a processing unit 608. The signals $e_1$ and $e_2$ are then passed through a divider 610 to divide them by the voltage E as illustrated in FIG. 6A to obtain values of $u_1$ and $u_2$.

The signals $u_1$ and $u_2$ are then passed to the PWM 612 where they are clipped to the range [−1, 1] and compared with a triangular signal, m(t), to generate a signals to control switches $s_1$–$s_4$ in a similar matter as discussed above with reference to the back-to-back realization of the compensator. The correspondence between control signals $u_1$ and $u_2$ and switches $s_1$–$s_4$ within the hybrid realization of the compensator may be the same as illustrated above in Table 1. The signals $s_1$–$s_4$ are then output from the processor 606 and signals $\bar{s}_1$–$\bar{s}_4$ are obtained by passing the signals $s_1$–$s_4$ through inverters.

Simulations

Simulations of the system 100 have been run for three cases: uncompensated, compensated with the ideal (infinite dimensional) filter and compensated with an approximate (first order) filter (e.g., the compensator 104).

The simulations were run with the system 100 modeled according to:

$$\begin{bmatrix} v(t,l) \\ i(t,l) \end{bmatrix} = T^{-1} \begin{bmatrix} e^{-sd} & 0 \\ 0 & e^{sd} \end{bmatrix} T \begin{bmatrix} v(t,0) \\ i(t,0) \end{bmatrix} \qquad \text{Equation 21}$$

where $$T = \begin{bmatrix} 1 & Z_0 \\ 1 & -Z_0 \end{bmatrix}, Z_0 = \sqrt{\frac{L}{C}}$$

it the line characteristic impedance, and $d=l\sqrt{LC}$ is the propagation delay.

Inductance, capacitance and resistance of the cable were chosen as L=0.97 µH/m, C=45 pF/m, R=50 mΩ/m, and the length of the cable was set to be l=100 m. These values were calculated from measured S-parameters by a network analyzer. Further, they were confirmed by a high speed digital sampling oscilloscope which is used to measure transport delay (d=6.6 nsec) and characteristic impedance ($Z_0$=146.8Ω). The motor 108 was modeled by a high frequency R-C ($C_{hf}$=750 pF, $R_{hf}$=300Ω), in parallel with a low frequency R-L model ($R_{lf}$=2.5Ω, $L_{lf}$=180 mH).

Figure 7:
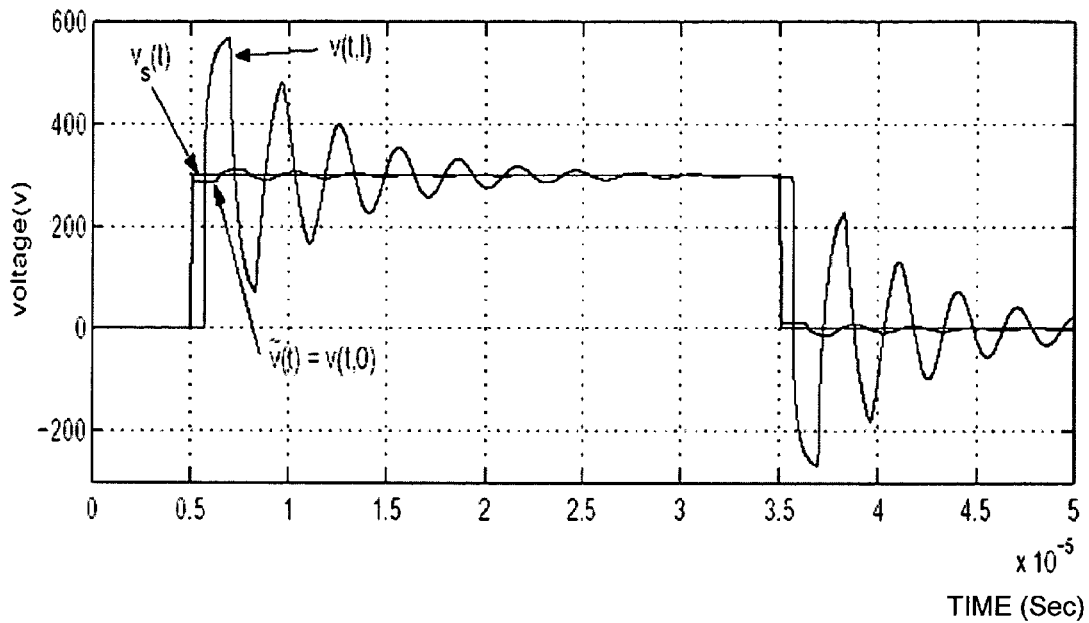
FIG. 7 illustrates one example of a plot of a step response of the compensator.
Figure 8:
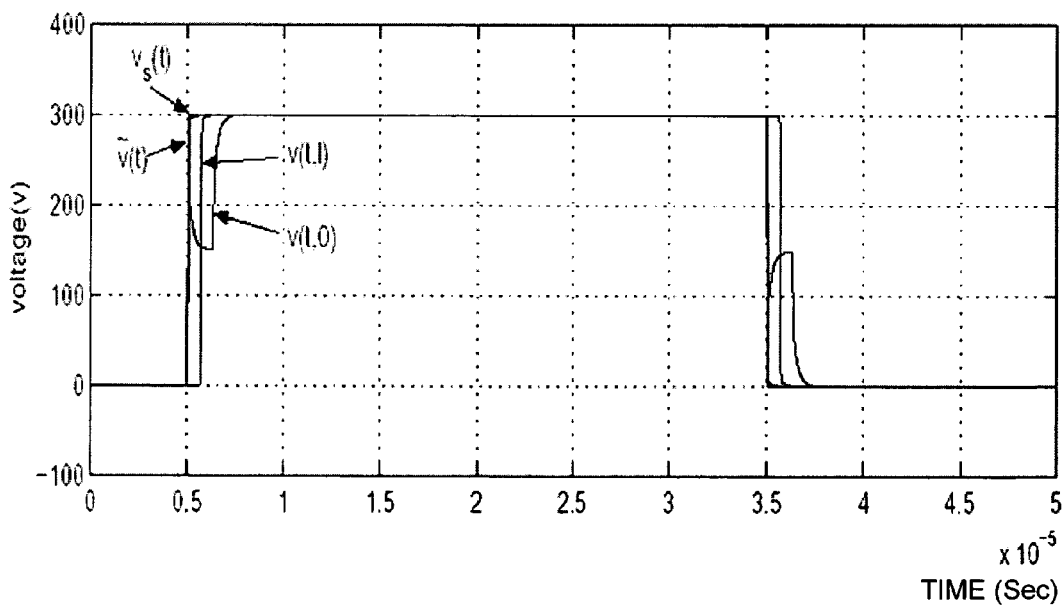
FIG. 8 illustrates another example of a plot of a step response of the compensator.

The step response of the uncompensated case, which exhibits a highly oscillatory behavior, is illustrated in FIG. 7. The response including the ideal filter is illustrated in FIG. 8 (notice that the time scale has been modified to better illustrate the transient performance improvement). Suppression of the wave reflection is achieved, as illustrated by elimination of the ringing effect. To test one practical effectiveness of the proposed solution, a finite dimensional approximation of the ideal filter was also implemented. A first order Pade's approximation of the time-delay $$e^{-2sd} \approx \frac{1-ds}{1+ds}$$

was utilized. After applying this approximation to the ideal filter, an approximated filter is obtained as $$\begin{bmatrix} -lLs & 1+ds \\ ds-1 & lCs \end{bmatrix}.$$

Figure 9:
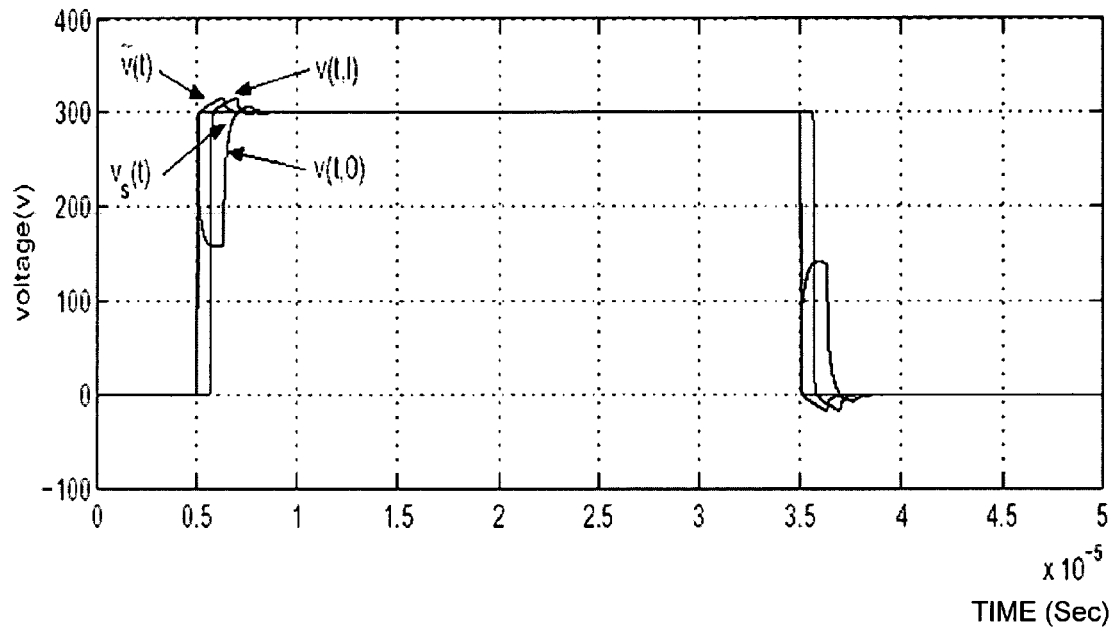
FIG. 9 illustrates yet another example of a plot of a step response of the compensator.

Notice that this filter is improper, thus for its practical implementation the differentiators have been replaced with approximate derivative filters $$s \approx \frac{ks}{\tau s + 1}$$

where k=1, $\tau=10^{-6}$ to reproduce the derivative action in the bandwidth of interest. The resulting step response, illustrated in FIG. 9, exhibits now a slight overshoot but the performance is still good. A reduction of the ringing (as seen in FIG. 7) is accomplished.

Figure 10:
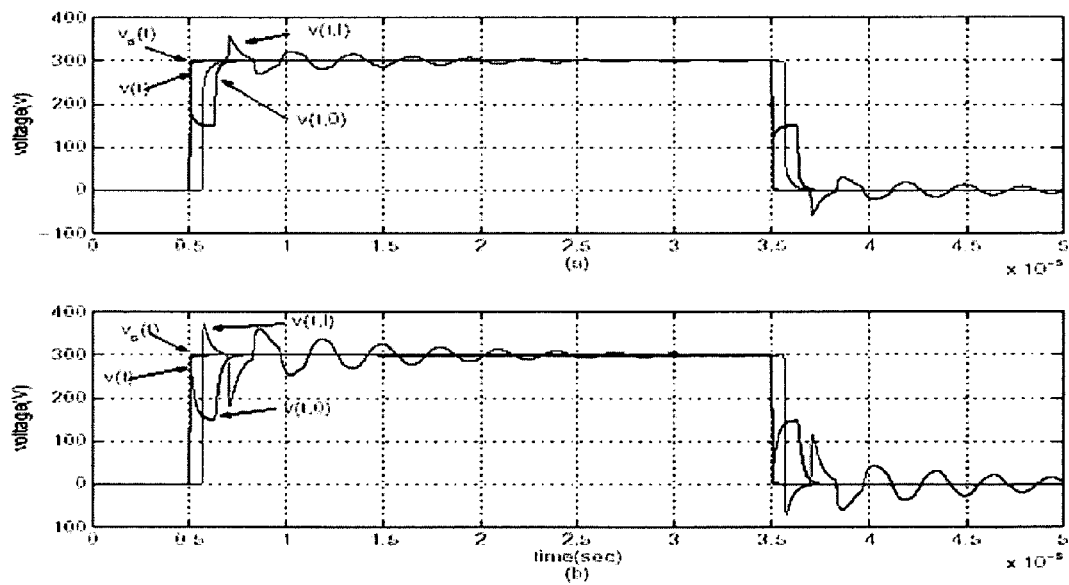
FIG. 10 illustrates one example of a response of the compensator when errors of −50% and +100% are made on the transmission line characteristic impedance estimations.

FIG. 10 illustrates one example of a response of the ideal filter when errors of −50% and +100% are made on the line characteristic impedance. The degradation of the control quality is evident from these graphs.

The developments reported here can also be extended to VLSI applications. In many of today's IC and PCB applications, transmission lines and interconnects play a vital role at virtually every level of integration. Fast devices switch in a few picoseconds, and high megabaud data rates have become commonplace in modern digital computers and switching networks used for telecommunications. Signal delays and rise times are more and more limited by interconnection lengths rather than by device speed. They represent a potential obstacle to the ultimate scaling reduction of VLSI technology. Shorter rise and fall times as well as higher frequency signals have compelled most transmission lines to operate within ranges where dispersion is no longer negligible. Many applications in microwave and digital communications require the use of transmission lines terminated with nonlinear devices. Distortions and noise occur when the terminations are not matched to the line impedance. Moreover, if losses and dispersion are present in the line, attenuation and time delay come into picture.

Discrete-Time Adaptive Implementation

In one embodiment, an adaptive compensator can be used. The compensator output signals may be sampled every d units of time to detect for the need for adaptation. The compensator may function without knowing the characteristic impedance of the transmission line and then adaptively modify output signals to achieve better values that more closely reflect the characteristic impedance of the transmission line.

Figure 11:
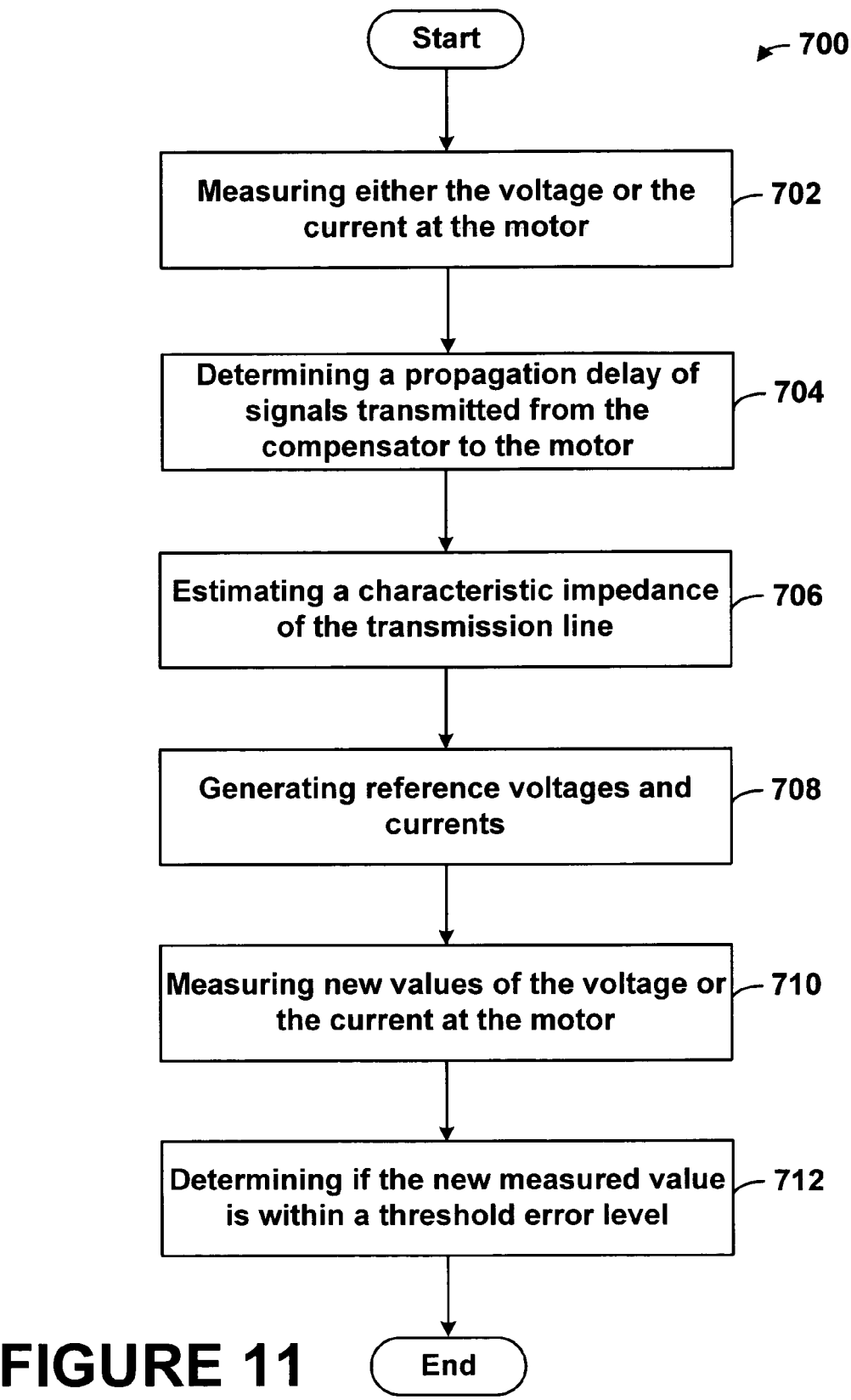
FIG. 11 is a flowchart depicting one embodiment of a set of functions that could be employed within the compensator to achieve adaptive control of the compensator.

FIG. 11 is a flowchart depicting one embodiment of a set of functions 700 that could be employed within the compensator to achieve adaptive control of the compensator. As shown at block 702, initially either the current or the voltage on the motor side of the compensator (e.g., i(t,l) or v(t,l)) is measured. Next, a propagation delay (e.g., d) of signals transmitted from the compensator to the motor is determined, as shown at block 704. The propagation delay can be determined based on line measurements or based on a look-up table using materials properties of the cabling and the length of the cable, for example.

Using the propagation delay and either the measured i(t,l) or v(t,l), a characteristic impedance, $Z_0$, is then estimated, as shown at block 706. The characteristic impedance may be estimated as shown below through Equations 22–36 using the measured current i(t,l) or through Equations 37–45 using the measured voltage v(t,l), for example. Using the estimated characteristic impedance, reference voltages and currents (e.g., ĩ and v(t,0)) are then generated and transmitted to the motor, as shown at block 708. Next, the new values of the current or voltage at the motor (e.g., i(t,l) or v(t,l)) are measured, as shown at block 710. The compensator then determines whether the new measured values are within a threshold error level, as shown at block 712. If the new measured values are not within the threshold level (e.g., the voltage at the motor has as undesirable spike), then the set of functions 700 is repeated to estimate a new value for the characteristic impedance. This method 700 may be repeated until the measured i(t,l) or v(t,l) meets the threshold error level.

In one embodiment, to set up an error model upon which the adaptation can be based, the current at the terminal point (i.e., i(t,l)) can be measured, as noted at block 702. Denote:

$i^l_k = i(kd,l),$ $v^0_k = v(kd,0),$ $i^0_k = i(kd,0),$ $\tilde{i}_k = \tilde{i}(kd),$ $\tilde{v}_k = \tilde{v}(kd)$      Equations 22–26 where k is a constant and $i^l_k$ is measured current on the motor, and d is known. Using this notation, the transmission line equation is written as:

$2i^l_k = \theta(v^0_{k-1} - v^0_{k+1}) + i^0_{k-1} + i^0_{k+1}$      Equation 27 where the unknown parameter is defined as $$\theta = \frac{1}{Z_0}.$$

(Notice that, if d is known, this is the only parameter needed for the implementation of the following equations below (Equations 34–39)).

Similarly, inverting the proposed filter transfer matrix below:

$$\begin{bmatrix} \tilde{i}(t) \\ v(t,0) \end{bmatrix} = $$

$$\frac{1}{1+e^{-2ds}} \begin{bmatrix} \frac{1}{Z_0}(1-e^{-2ds}) & -2 \\ -2e^{-2ds} & -Z_0(1-e^{-2ds}) \end{bmatrix} \begin{bmatrix} \tilde{v}(t) \\ i(t,0) \end{bmatrix}$$

Equation 28 the following relation is obtained:

$i^0_k = -i^0_{k-2} + 2\tilde{i}_{k-2} + \theta(v^0_k - v^0_{k-2})$      Equation 29

Replacement of Equation 29 in Equation 27 yields the desired behavior for the current, namely, $i^l_k = \tilde{i}_{k-1}$. A certainty equivalent adaptive version of the control law above is obtained replacing the unknown parameter θ by its current estimate, that is denoted $\hat{\theta}_k$, to yield:

$i^0_k = -i^0_{k-2} + 2\tilde{i}_{k-2} + \hat{\theta}_k(v^0_k - v^0_{k-2})$      Equation 30

Shifting Equation 30 and replacing it in Equation 27 yields, after some simple derivations, the error equation:

$e_k = \tilde{\theta}_k \phi_k$      Equation 31 where $\tilde{\theta}_k = \hat{\theta}_k - \theta$ is the parameter error, and the measurable quantities are defined as:

$e_k = i^l_{k-1} - \tilde{i}_{k-2},$      Equations 32–33

$\phi_k = \frac{1}{2}(v^0_k - v^0_{k-2})$

Consider a transmission line, modeled via the Telegrapher's equations in cascade with the discrete-time adaptive controller:

$\tilde{v}_k = -\tilde{v}_{k-2} + 2v^0_k - \frac{1}{\hat{\theta}_k}(\tilde{i}_k - \tilde{i}_{k-2})$      Equations 34-35

$i^0_k = -i^0_{k-2} + 2\tilde{i}_{k-2} + \hat{\theta}_k(v^0_k - v^0_{k-2})$ where the parameter is updated as:

$$\hat{\theta}_{k-1} = P\left\{\hat{\theta}_k - \frac{\gamma \phi_k}{1 + \phi_k^2} e_k\right\}$$      Equation 36 with $\phi_k$, $e_k$ defined in Equations 32–33, 2>γ>0 is an adaptation gain and P { . . . } is a projection operator that keeps the estimate bounded away from zero.

A consequence of the above is that Equations 34–35 with $$\hat{\theta}_k = \theta = \frac{1}{Z_0}$$

are discrete-time finite-dimensional realizations of a filter that transforms the transmission line into a delay, reducing and/or eliminating the wave reflections, for the sampled signals.

The projection operator in the estimator in Equation 36 can be removed if the controller is over-parameterized, introducing a new estimator for $Z_0$, and assuming that v(t,l) is also measurable.

Figure 12:
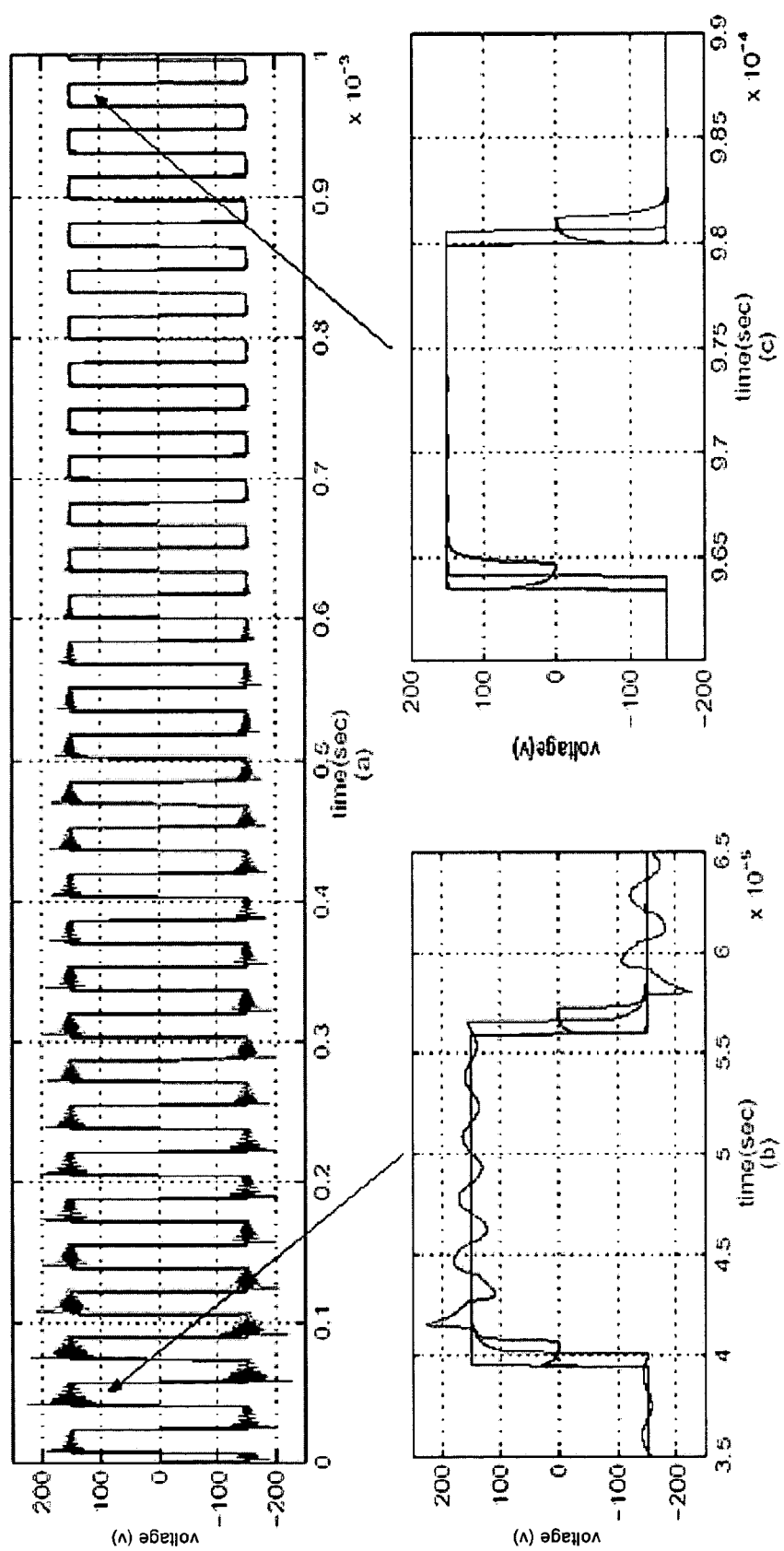
FIG. 12 illustrates one example of a plot of an output voltage of an adaptive controller with an adaptation gain $\gamma=0.004$ for the first case and $\gamma=0.01$ in the latter case.

FIG. 12 illustrates one example of a plot of an output voltage of an adaptive controller with an adaptation gain γ=0.004 for the first case and γ=0.01 in the latter case. As illustrated, the parameter convergence is slow, and the erratic behavior of the parameter estimate during the transient generated high voltage and current peaks. However, the adaptation performed well to remove the ringing after a period of time. Other more advanced estimation schemes, like weighted least squares, could be used to alternatively overcome this drawback.

In another embodiment, to set up an error model upon which the adaptation can be based (and $Z_0$ is estimated), the voltage at the terminal point (i.e., v(t,l)) can be measured, as noted at block 702. Using denotations similar to Equations 22–26, the first equation of the TL can be written as:

$2v^l_k = v^1_{k+1} + v^0_{k-1} - Z_0(i^0_{k+1} - i^0_{k-1})$      Equation 37

Similarly, from the second equation in the proposed filter transfer matrix (Equation 28), the following relation is obtained:

$v^0_k = -v^0_{k-2} + 2\tilde{v}_{k-2} + Z_0(i^0_k - i^0_{k-2})$      Equation 38

Replacement of Equation 38 in Equation 37 yields the desired behavior for the voltage, namely, $v^l_k = \tilde{v}_{k-1}$. A certainty equivalent adaptive version of the control law above is obtained replacing the unknown parameter $Z_0$ by its current estimate, that is denoted $\hat{Z}^0_k$, to yield:

$v^0_k = -v^0_{k-2} + 2\tilde{v}_{k-2} + \hat{Z}^0_k(i^0_k - i^0_{k-2})$      Equation 39

Shifting Equation 39 and replacing it in Equation 37 yields, after some derivations, the error equation:

$e_k = (\hat{Z}^0_k - Z_0)\phi_k$      Equation 40 where the measurable quantities are defined as:

$$e_k = v^t_{k-1} - \tilde{v}_{k-2},$$
$$\phi_k = \frac{1}{2}(i^0_k - i^0_{k-2})$$

Equations 41-42

Discretizing the first controller Equation 28 and applying certainty equivalence, the following result is obtained. Consider a transmission line, modeled via the Telegrapher's equations in cascade with the discrete-time adaptive controller:

$$v^0_k = -v^0_{k-2} + 2\tilde{v}_{k-2} + \hat{Z}^0_k(i^0_k - i^0_{k-2})$$
$$\tilde{i}_k = -\tilde{i}_{k-2} + 2i^0_k + \frac{1}{\hat{Z}^0_k}(\tilde{v}^0_k - \tilde{v}_{k-2})$$

Eqautions 43-44 where the parameter is updated as:

$$\hat{Z}^0_{k+1} = P\left\{\hat{Z}^0_k - \frac{\gamma\phi_k}{1+\phi^2_k}e_k\right\}$$

Equation 45 with $\phi_k$, $e_k$ defined in Equations 41–42, $2 > \gamma > 0$ is an adaptation gain and P { . . . } is a projection operator that keeps the estimate bounded away from zero.

A consequence of the above is the proof that Equations 43–44 with $$\hat{\theta}_k = \theta = \frac{1}{Z_0}$$

are discrete-time finite-dimensional realizations of a filter that transforms the transmission line into a delay, reducing and/or eliminating the wave reflections, for the sampled signals.

The compensator discussed herein may be realized in other manners, as can the functions of the compensator. For example, in a case of a low power application, for instance at a laboratory scale, it is possible to realize the compensator with a voltage-to-current converter to inject the required current similar to standard parallel active filters (as described in L. Moran and G. Joos, Principles of Active Power Filters, IEEE—IAS Tutorial Course Notes, October 1998, Saint-Louis, Mo., USA) plus a current amplifier (also referred as a power amplifier) whose output is the voltage that would be connected to the transformer to inject the voltage in series (like in standard series active filters). These devices can be built with operational amplifiers and transistors, for example. Other examples are possible as well.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method for modifying a motor drive signal, the motor drive signal created by a pulse generator and coupled to a motor via a compensator, the method comprising:

receiving a pulsed motor drive signal from the pulse generator;

obtaining compensator current and compensator voltage measurements including an output current of the compensator and an input voltage of the compensator, the output current of the compensator and the input voltage of the compensator generated in part due to the pulsed motor drive signal;

generating compensator reference values based on a characteristic line impedance of a line coupling the pulse generator to the motor, a propagation delay parameter of the line, and the compensator current and compensator voltage measurements; and controllably adjusting a compensator current source and a compensator voltage source in response to error signals computed from the compensator current and compensator voltage measurements and the compensator reference values in order to generate a compensator motor drive signal.

2. A method of compensating a motor drive signal, the motor drive signal created by a pulse generator and coupled to a motor via a compensator, the method comprising:

receiving the motor drive signal from the pulse generator;

obtaining compensator current and compensator voltage measurements generated in part due to the motor drive signal;

generating compensator reference values based on a characteristic line impedance of a line coupling the pulse generator to the motor, a propagation delay parameter of the line, and the compensator current and compensator voltage measurements; and controllably adjusting a compensator current source and a compensator voltage source in response to error signals computed from the compensator current and compensator voltage measurements and the compensator reference values in order to modify the motor drive signal, thereby providing a compensator motor drive signal.

3. The method of claim 2, wherein the step of generating compensator reference values comprises generating a reference current waveform and a reference voltage waveform.

4. The method of claim 2, wherein the characteristic line impedance is estimated in response to material properties of a transmission line.

5. The method of claim 2, wherein the propagation delay parameter is estimated in response to material properties of a transmission line.

6. The method of claim 2, wherein the propagation delay parameter is estimated in response to propagation delay measurements.

7. The method of claim 3, wherein the reference current waveform and the reference voltage waveform are continuous-time signals.

8. The method of claim 3, wherein the reference current waveform and the reference voltage waveform are discrete-time signals.

9. The method of claim 8, wherein the reference current waveform and the reference voltage waveforms are stored in a memory device.

10. The method of claim 2, wherein the step of obtaining compensator current and compensator voltage measurements comprises measuring a compensator input voltage and compensator output current.

11. The method of claim 10, wherein the measurements are analog signals.

12. The method of claim 10, wherein the measurements are discrete time signals.

13. The method of claim 2, wherein the compensator current source is a parallel active filter and the compensator voltage source is a series active filter.

14. The method of claim 13, wherein the parallel active filter and series active filter are controlled by a pulse controller.

15. The method of claim 14, wherein the pulse controller is a pulse width modulation controller.

16. The method of claim 2, wherein the step of controllably adjusting a compensator current source and a compensator voltage source is performed by a microcontroller.

17. The method of claim 2, wherein the step of controllably adjusting a compensator current source and a compensator voltage source is performed using analog controllers.

18. The method of claim 17, wherein the analog controllers are proportional integral derivative (PID) controllers.

19. The method of claim 17, wherein the analog controllers are proportional integral (PI) controllers.

20. The method of claim 1, wherein controllably adjusting the compensator current source and the compensator voltage source to generate a compensator motor drive signal comprises applying a linear combination of controlled voltages and currents to the pulsed motor drive signal to generate a modified pulse.

21. The method of claim 20, further comprising propagating the modified pulse to the motor.

22. The method of claim 21, further comprising combining the modified pulse with wave reflections created due to the line coupling the pulse generator to the motor to provide a desired voltage to the motor.

23. The method of claim 1, wherein generating the compensator reference values comprises solving the following relation:

$$\begin{bmatrix} \tilde{i}(t) \\ v(t,0) \end{bmatrix} = \frac{1}{1+e^{-2ds}} \begin{bmatrix} \frac{1}{Z_0}(1-e^{-2ds}) & -2 \\ -2e^{-2ds} & -Z_0(1-e^{-2ds}) \end{bmatrix} \begin{bmatrix} \tilde{v}(t) \\ i(t,0) \end{bmatrix},$$

where $Z_0$ is the characteristic line impedance, d is the propagation delay parameter of the line, $\tilde{v}(t)$ is the compensator voltage measurement, $i(t,0)$ is the compensator current measurement, $\tilde{i}(t)$ is a compensator current reference value, and $v(t,0)$ is a compensator voltage reference value.

24. The method of claim 1, wherein generating the compensator motor drive signal comprises generating time-delayed versions of the compensator current measurement and the compensator voltage reference value.

25. The method of claim 1, further comprising generating the error signals by comparing the compensator reference values to stored desired values of the compensator reference values.

* * * * *